UNITED STATES PATENT OFFICE.

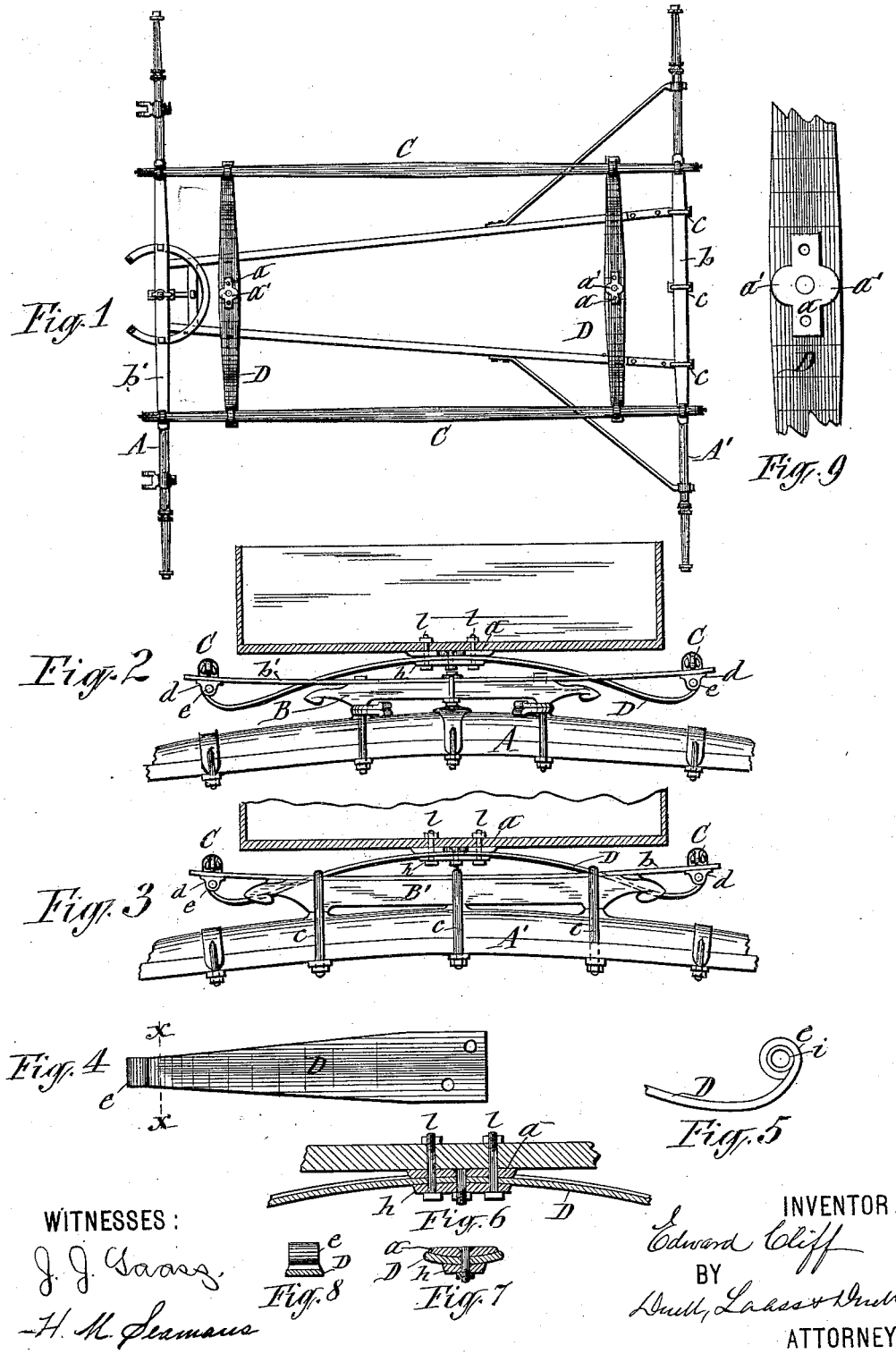

EDWARD CLIFF, OF NYACK, NEW YORK.

SPRING-VEHICLE.

SPECIFICATION forming part of Letters Patent No. 408,871, dated August 13, 1889.

Application filed May 27, 1889. Serial No. 312,194. (No model.)

*To all whom it may concern:*

Be it known that I, EDWARD CLIFF, of Nyack, in the county of Rockland, in the State of New York, have invented new and useful Improvements in Spring-Vehicles, of which the following, taken in connection with the accompanying drawings, is a full, clear, and exact description.

This invention relates to the class of spring-vehicles designated "side-bar buggies," and which have the side bars carried on cross-springs mounted on the front and hind running-gears and the body supported on cross-springs hung on the side bars; and the invention consists in an improved form of said cross-springs, which are thereby strengthened, so as to allow them to be formed of thinner leaves of steel without impairing their safety; and the invention also consists in novel devices for attaching my improved springs to the vehicle, all as hereinafter fully described, and specifically set forth in the claims.

In the annexed drawings, Figure 1 is a top plan view of a vehicle minus its body and wheels and showing the springs in their respective positions. Figs. 2 and 3 are respectively front and rear views of said vehicle. Fig. 4 is a detached plan view of a so-called "half cross-spring" embodying my improvement. Fig. 5 is a side view of the coupling end of the spring provided with the anti-friction metal bushing in its shackle-eye. Figs. 6 and 7 are respectively longitudinal and transverse sections of the central portion of my improved spring. Fig. 8 is a transverse section on line $x\ x$, Fig. 4; and Fig. 9 is an enlarged plan view of the saddle which is mounted on the cross-spring.

Similar letters of reference indicate corresponding parts.

A and A' represent, respectively, the front and hind axles of the vehicle, and B denotes the head-block, mounted on the front axle in the usual manner.

On the hind axle I mount the bolster B', which is extended in length to reach nearly to the side bars C C, for the purpose of supporting nearly the entire length of the steel plate $b$, which is placed flatwise onto the bolster and secured thereto by the clips $c\ c\ c$, which also fasten the bolster to the axle. Said plate is rendered nearly or quite rigid by its supports on the bolster at points in proximity to the side bars C C, as shown in Fig. 3 of the drawings. The end portions of the plate $b$, which extend beyond the ends of the bolster, I taper in width to a proper size to receive through them the shanks of the clips which fasten the side bars to the said plate. The head-block B, I also extend in length as much as possible without impairing the appearance of it, and on it I mount a stiff steel plate $b'$, similar to that on the bolster B', before described, and bolted to the end portions of the head-block.

D D represent the cross-springs, which are hung on the side bars and support the body, as shown in Figs. 2 and 3 of the drawings. Each of said springs I form of a single leaf, to which I impart the requisite strength combined with the desired elasticity by forming it with a broad central portion and tapering it in width gradually from the center to the ends, and bending it transversely so as to impart to it a concavo-convex shape in cross-section, which shape gradually vanishes toward the ends of the spring, so that the spring terminates with flat end portions, which latter I bend into the shape of horizontal shackle-eyes $e\ e$, standing axially at right angles to the length of the spring. By means of these shackle-eyes the spring is hung on the clip-ties $d\ d$, which are fastened to the side bars, and are formed with perforated ears, between which the shackle-eyes $e\ e$ are entered and retained by bolts passing through the said ears and eyes.

In order to protect the shackle-eyes $e\ e$ from wear and abrasion, I make them considerably larger than the bolts and insert in said eyes anti-friction metal bushings $i\ i$, of the form of short tubes of brass or other suitable metal, as shown in Fig. 5 of the drawings.

On the top of the central portion of each spring D, I mount a saddle $a$, the under side of which is concaved longitudinally to conform to the crown of the spring, and convexed transversely to correspond to the concavity of the spring. The top of said saddle is straight to afford a good bearing for the body of the vehicle which is mounted thereon. This bearing I enlarge by forming it with laterally-extended central bearings $a'$ $a'$, as shown in Fig. 9 of the drawings.

The saddle is secured to the spring by a bolt or rivet passing through the center of said parts and through a washer $h$ on the under side of the spring, said washer being concaved on the top to fit to the convexity of the under side of the spring, and it is elongated in the direction of the length of the spring and provided with additional perforations for the reception of the bolts $l\ l$, which pass through corresponding perforations in the spring and saddle $a$ and through the bottom of the body, and firmly unite said parts. The bottom of the washer is straight and horizontal to allow the nuts to draw up squarely against the washer.

Having described my invention, what I claim as new, and desire to secure by Letters Patent, is—

1. In combination with the body and its supporting cross-spring, a metal saddle-plate secured to the center of said spring and having a flat top surface, and a longitudinally-concaved bottom surface conformed to the top surface of the spring.

2. In combination with the side bars, the bowed leaf-springs D D, formed with broad central portions and tapered gradually from said central portions to the ends and terminated with shackle-eyes axially at right angles to the length of the spring, couplings connecting said shackle-eyes to the side bars, and the body mounted on the broad central portions of said springs, substantially as described and shown.

3. A leaf-spring formed concave transversely in its main portion and terminating with flat end portions, as set forth.

4. The combination of a leaf-spring formed concave transversely and a saddle seated on the concave side of said spring and formed convex correspondingly, as described and shown.

5. The combination of a bowed leaf-spring formed concave transversely and a saddle seated on the concave side of the spring and formed convex transversely and concave longitudinally to conform to the shape of the spring, substantially as described and shown.

6. A carriage cross-spring composed of a single leaf formed concavo-convex in cross-section and placed with its concave side upward, a saddle seated on the concave side of the spring and having its under side formed convex correspondingly and its top formed straight, and a washer on the under side of the spring and formed with a correspondingly-concave top and straight bottom, and a bolt or rivet passing vertically through the aforesaid parts and uniting the same, as set forth and shown.

7. A carriage cross-spring composed of a single leaf formed concavo-convex in cross-section and tapered gradually in width from its central portion to the ends, substantially as described and shown.

8. In combination with the side bars, a steel cross-bar disposed with its flat sides horizontally and secured at opposite ends to the side bars, and a rigid bolster secured to the under side of the aforesaid cross-bar and extending lengthwise thereof to points in proximity to the side bars.

In testimony whereof I have hereunto signed my name this 21st day of May, 1889.

EDWARD CLIFF. [L. S.]

Witnesses:
 WM. J. GREEN,
 FRED. W. GREEN.